United States Patent
Kelly et al.

(10) Patent No.: US 11,336,910 B2
(45) Date of Patent: *May 17, 2022

(54) METHOD AND SYSTEM FOR IMPLEMENTING SPLIT AND PARALLELIZED ENCODING OR TRANSCODING OF AUDIO AND VIDEO CONTENT

(71) Applicant: BombBomb, Inc., Colorado Springs, CO (US)

(72) Inventors: Jeremy Robert Kelly, Colorado Springs, CO (US); Charles E. Gibson, Jr., Colorado Springs, CO (US)

(73) Assignee: BombBomb, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/171,776

(22) Filed: Feb. 9, 2021

(65) Prior Publication Data

US 2021/0168390 A1 Jun. 3, 2021

Related U.S. Application Data

(63) Continuation of application No. 16/146,505, filed on Sep. 28, 2018.

(Continued)

(51) Int. Cl.
*H04N 7/173* (2011.01)
*H04N 19/436* (2014.01)
(Continued)

(52) U.S. Cl.
CPC ......... *H04N 19/436* (2014.11); *G10L 19/167* (2013.01); *H04L 65/605* (2013.01); *H04L 65/607* (2013.01); *H04N 19/70* (2014.11)

(58) Field of Classification Search
CPC .... H04N 19/436; H04N 19/70; G10L 19/167; H04L 65/605; H04L 65/607
See application file for complete search history.

(56) References Cited

U.S. PATENT DOCUMENTS 10,313,675 B1 * 6/2019 Lin .................... H04N 19/147
10,643,184 B2 5/2020 Green et al.
(Continued)

FOREIGN PATENT DOCUMENTS

EP 3837847 6/2021
KR 10-2011-0051336 A 5/2011
(Continued)

OTHER PUBLICATIONS

International Search Report and Written Opinion, prepared by the International Application Division of the Korean Intellectual Property Office for PCT/US2019/040160 dated Oct. 30, 2019, 9 pages.

(Continued)

*Primary Examiner* — Mulugeta Mengesha
(74) *Attorney, Agent, or Firm* — Adsero IP

(57) ABSTRACT

Novel tools and techniques are provided for implementing split and parallelized encoding or transcoding of audio and video. In various embodiments, a computing system might split an audio-video file that is received from a content source into a single video file and a single audio file. The computing system might encode or transcode the single audio file. Concurrently, the computing system might split the single video file into a plurality of video segments. A plurality of parallel video encoders/transcoders might concurrently encode or transcode the plurality of video segments, each video encoder/transcoder encoding or transcoding one video segment of the plurality of video segments. Subsequently, the computing system might assemble the plurality of encoded or transcoded video segments with the encoded or transcoded audio file to produce an encoded or (Continued)

transcoded audio-video file, which may be output to a display device(s), an audio playback device(s), or the like.

20 Claims, 7 Drawing Sheets

Related U.S. Application Data

(60) Provisional application No. 62/764,879, filed on Aug. 16, 2018.

(51) Int. Cl.
   *H04L 65/60* (2022.01)
   *G10L 19/16* (2013.01)
   *H04N 19/70* (2014.01)

(56) References Cited

U.S. PATENT DOCUMENTS

| | | | |
|---|---|---|---|
| 10,951,906 B2 | 3/2021 | Kelly et al. | |
| 2008/0162713 A1 | 7/2008 | Bowra et al. | |
| 2013/0160063 A1* | 6/2013 | Rashid | H04L 65/608 |
| | | | 725/116 |
| 2013/0272374 A1* | 10/2013 | Eswaran | H04L 29/06523 |
| | | | 375/E7.168 |
| 2014/0119457 A1 | 5/2014 | MacInnis et al. | |
| 2014/0153909 A1 | 6/2014 | MacInnis et al. | |
| 2015/0143444 A1* | 5/2015 | Dong | H04N 21/435 |
| | | | 725/116 |
| 2016/0134881 A1 | 5/2016 | Wang et al. | |
| 2019/0149819 A1* | 5/2019 | Phillips | H04L 65/607 |
| | | | 375/240.02 |
| 2020/0059654 A1 | 2/2020 | Kelly et al. | |

FOREIGN PATENT DOCUMENTS

| | | |
|---|---|---|
| KR | 10-2012-0068285 A | 6/2012 |
| KR | 10-1643529 | 8/2016 |
| WO | WO-2020-036692 A1 | 2/2020 |

OTHER PUBLICATIONS

U.S. Appl. No. 16/102,308, Non-Final OA, dated Feb. 14, 2020, 25 pages.
U.S. Appl. No. 16/102,308, Final OA, dated Jun. 30, 2020, 27 pages.
U.S. Appl. No. 16/102,308, Notice of Allowance, dated Dec. 28, 2020, 19 pages.
International Application No. PCT/US2019/040160 International Preliminary Report on Patentability, dated Feb. 25, 2021, 5 pages.
Communication pursuant to Rules 161(1) and 162 EPC dated Mar. 24, 2021, 3 pages.
Certificate of Registration, Application No. CA-05820180 dated Mar. 24, 2021, 1 page.
EP Application No. 19849520.2 Extended European Search Report, dated Mar. 23, 2022, 10 pages.

* cited by examiner

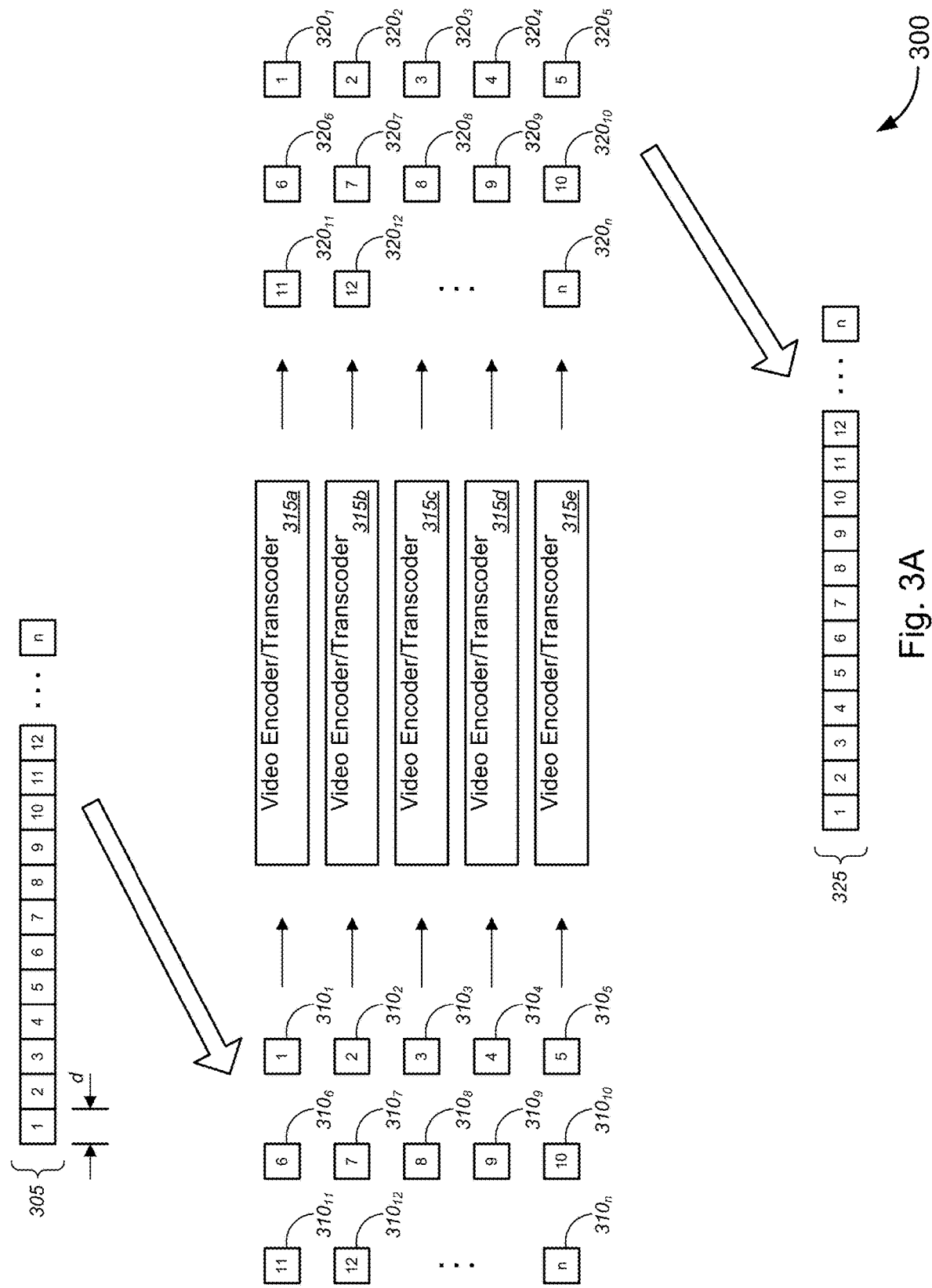

METHOD AND SYSTEM FOR IMPLEMENTING SPLIT AND PARALLELIZED ENCODING OR TRANSCODING OF AUDIO AND VIDEO CONTENT

CROSS-REFERENCES TO RELATED APPLICATIONS

This application is a continuation application of U.S. patent application Ser. No. 16/146,505 (the "'505 Application"), filed Sep. 28, 2018 by Jeremy Robert Kelly et al., entitled, "Method and System for Implementing Split and Parallelized Encoding or Transcoding of Audio and Video Content," which claims priority to U.S. Patent Application Ser. No. 62/764,879 (the "'879 Application"), filed Aug. 16, 2018 by Jeremy Robert Kelly et al., entitled, "Split and Parallelized Method for the Encoding of Audio/Video," the disclosures of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing encoding or transcoding of audio and video, and, more particularly, to methods, systems, and apparatuses for implementing split and parallelized encoding or transcoding of audio and video.

BACKGROUND

Video encoding or transcoding today is generally performed in a single-stream methodology. That is, the bytes constituting the video from start to finish are processed serially from start to finish in a single line. This means that an audio/video file is handed to an encoder or transcoder, and that encoder or transcoder starts at the beginning of the file and sequentially processes chunks of video and bytes. This single-file approach is bottlenecked by the speed of the encoder or transcoder at the center of the process.

Companies today typically use off-the-shelf linear encoders or transcoders to encode or transcode videos in a single-process methodology. Video encoding or transcoding is considered a heavy, slow, and necessary evil. It is generally considered CPU-bound—that is, if you want to go faster, you need to throw more gigahertz processing at the problem. More gigahertz processing will speed up processing, but does not leverage modern horizontal scaling and bursting capabilities of cloud computing in the interest of speed.

Although there have been attempts to parallelize processing, such attempts parallelize chunks of audio-video segments or streams (rather than splitting the audio from the video prior to parallelization). Consequently, such attempts tend to generate unacceptable audio artifacts.

Hence, there is a need for more robust and scalable solutions for implementing encoding or transcoding of audio and video, and, more particularly, to methods, systems, and apparatuses for implementing split and parallelized encoding or transcoding of audio and video.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A and 3B are schematic diagrams illustrating various embodiments for implementing split and parallelized encoding or transcoding of video files that have been split from an audio-video file.

DETAILED DESCRIPTION OF CERTAIN EMBODIMENTS

Overview

Figure 1:
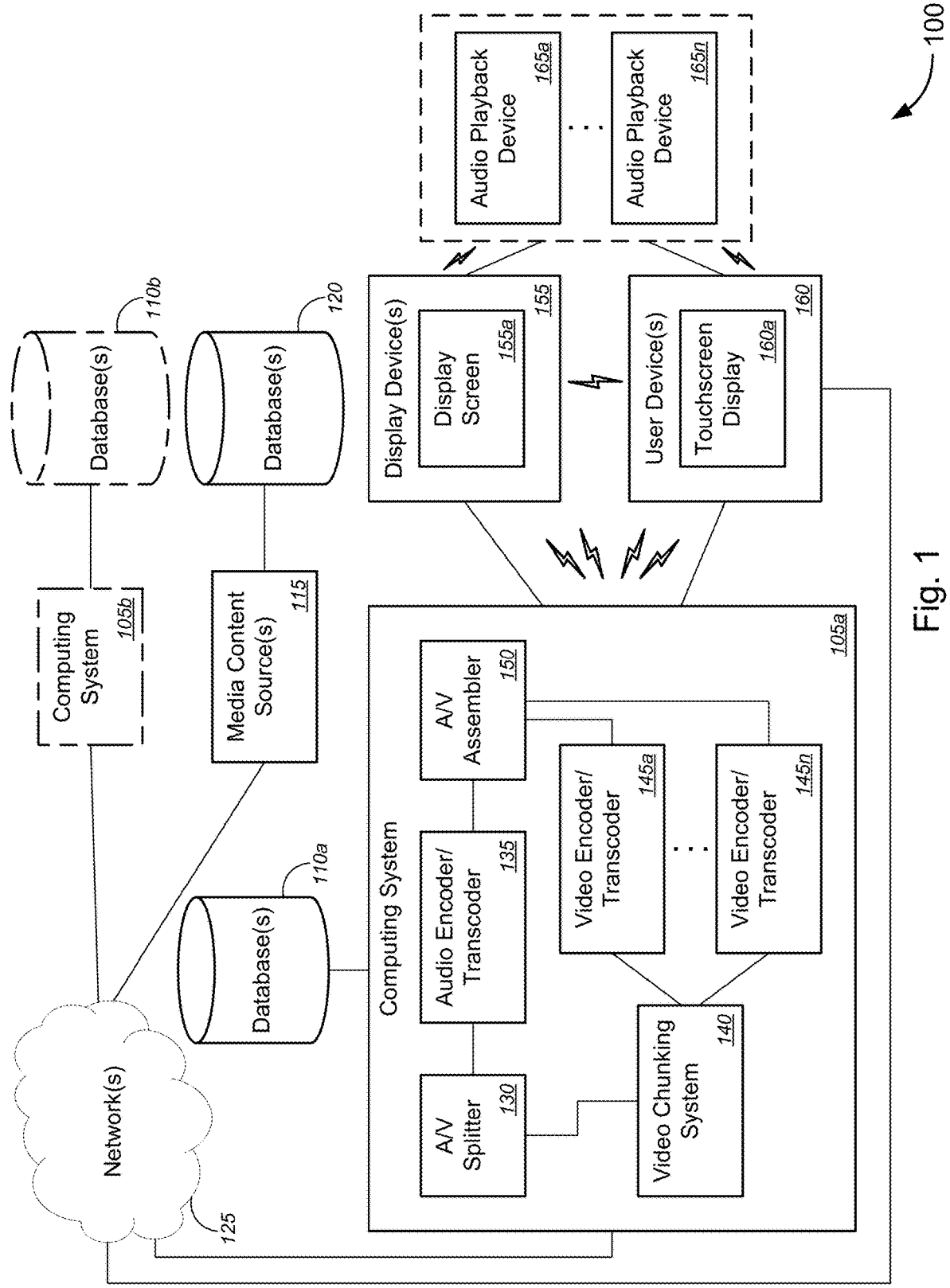
FIG. 1 is a schematic diagram illustrating a system for implementing split and parallelized encoding or transcoding of audio and video, in accordance with various embodiments.

Various embodiments provide tools and techniques for implementing encoding or transcoding of audio and video, and, more particularly, to methods, systems, and apparatuses for implementing split and parallelized encoding or transcoding of audio and video.

In various embodiments, a computing system might split an audio-video file that is received from a content source into a single video file and a single audio file. The computing system might encode or transcode the single audio file. Concurrently, the computing system might split the single video file into a plurality of video segments. A plurality of parallel video encoders/transcoders might concurrently encode or transcode the plurality of video segments, each video encoder/transcoder encoding or transcoding one video segment of the plurality of video segments. Subsequently, the computing system might assemble the plurality of encoded or transcoded video segments with the encoded or transcoded audio file to produce an encoded or transcoded audio-video file, which may be output to a display device(s), an audio playback device(s), or the like.

In some aspects, when encoding or transcoding a video file or video stream, the system and technique described herein splits the audio and the video streams, then, while the audio stream is encoded or transcoded locally in a single stream, the video stream is encoded or transcoded using a parallelized methodology before the encoded or transcoded audio and video streams are recombined together into a high-quality output at a previously unattainable speed. The system can encode or transcode audio/video streams more than 100 times faster and 10 times cheaper than the current state of the art. The system and techniques herein enable the processing of a large number of videos and can ensure such videos are ready as close to instantaneously as possible (i.e., addressing conventional issues with respect to speed of encoding/transcoding video content), which is a different problem from what most encoding/transcoding solutions prioritize (i.e., cost). The inventors are unaware of any prior art that discloses that the A/V is split at the head of the process to allow the audio to be encoded in a single stream while the video encoding is parallelized. Earlier attempts always chunked the audio and video together and then attempted assembling chunks of already-combined audio and video. Our methodology is different in that the audio is intentionally not brought into the chunked workflow. This results in the successful audio encoding that others have not been able to attain.

Importantly, the parallelization of the video encoding or transcoding yields an incredible speed advantage, essentially allowing for videos of any size to be encoded or transcoded in roughly the same amount of time (less than 10 seconds in practice) as other video content or the audio content that has been split off from the video content. This is unheard of. Modern function-as-a-service ("FaaS") offerings (e.g., AWS Lambda, Azure Cloud functions, or the like) allow such parallelized computing processes to run as needed, and then not run when work isn't underway. By utilizing such computing services to encode or transcode video content, significant cost savings may be achieved while capitalizing on the extremely scalable functionalities inherent with outsourcing compute processes in this manner. In contrast, to achieve similar effects, current state of the art cloud video encoding or transcoding systems require a scalable but standing fleet of encoding/transcoding servers, which results in costly, inefficient, and underutilized hardware that are additionally required to be robust and therefore expensive. Our methodology allows us to leverage the cost-savings of FaaS per-millisecond billing, which has reduced costs for video encoding in the real world by at least 10 times.

Finally, previous attempts at parallelization of video encoding has always failed to deal with audio streams successfully. Our solution results in high quality audio, absent of skipping sounds other attempts have not overcome.

These and other features of the split and parallelized encoding/transcoding system and techniques are described in detail below with respect to the figures.

Herein, and as understood by those having skill in the art, "encoding" might refer to converting raw, analog source content into a digital format, while "transcoding" might refer to converting an initial digital format into other digital formats. Because the system and techniques used herein are applicable to analog-to-digital as well as digital-to-digital conversion of video and audio content, for the purposes herein, the terms "encoding" and "transcoding" may be considered to be interchangeable, as both serve to convert files or streams of one format into another.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content encoding or transcoding technology, and/or the like. In other aspects, certain embodiments, can improve the functioning of user equipment or systems themselves (e.g., media encoders, media transcoders, encoding controllers, transcoding controllers, set-top boxes ("STBs"), digital video recording ("DVR") devices, media players, etc.), for example, by receiving, with a computing system, an audio-video file from a media content source; splitting, with the computing system, the received audio-video file into a single video file and a single audio file; splitting, with the computing system, the single video file into a plurality of video segments; concurrently encoding or transcoding, using a plurality of parallel video encoders/transcoders, the plurality of video segments, each video encoder/transcoder of the plurality of parallel video encoders/transcoders encoding or transcoding one video segment of the plurality of video segments, each video encoder/transcoder corresponding to each video segment; encoding or transcoding, using an audio encoder/transcoder, the single audio file; assembling, with the computing system, the plurality of encoded or transcoded video segments with the encoded or transcoded audio file to produce an encoded or transcoded audio-video file; and outputting, with the computing system, the encoded or transcoded audio-video file, and/or the like.

In particular, to the extent any abstract concepts are present in the various embodiments, those concepts can be implemented as described herein by devices, software, systems, and methods that involve specific novel functionality (e.g., steps or operations), such as, splitting an audio-video file or stream into a single audio file or stream and a single video file or stream, with the single audio file or stream being encoded or transcoded concurrently with the single video file or stream being split or chunked into a plurality of video segments that are subsequently concurrently encoded or transcoded using a plurality of parallel encoders/transcoders (that can number in the scores, the hundreds, the thousands, the tens of thousands, the hundreds of thousands, or the like), and with the encoded or transcoded audio file or stream and the plurality of encoded or transcoded video segments being assembled into a single encoded or transcoded audio-video file or stream, and/or the like, to name a few examples, that extend beyond mere conventional computer processing operations. These functionalities can produce tangible results outside of the implementing computer system, including, merely by way of example, optimized encoding/transcoding of video content that can achieve extremely quick encoding or transcoding of video content (within 10 seconds or so regardless of the size of the video components) that meanwhile ensures high quality audio (by avoiding audio artifacts that may arise due to encoding/transcoding of split and parallelized combination of audio and video content), thereby resulting in robust, cost-effective, extremely scalable, and extremely fast encoding or transcoding of audio-video content, and/or the like, at least some of which may be observed or measured by users and/or service providers.

In an aspect, a method might comprise receiving, with a computing system, an audio-video file from a media content source and splitting, with the computing system, the received audio-video file into a single video file and a single audio file. The method might also comprise splitting, with the computing system, the single video file into a plurality of video segments and concurrently encoding, using a plurality of parallel video encoders, the plurality of video segments, each video encoder of the plurality of parallel video encoders encoding one video segment of the plurality of video segments, each video encoder corresponding to each video segment. Concurrent with the video encoding, the method might comprise encoding, using an audio encoder, the single audio file. The method might further comprise assembling, with the computing system, the plurality of encoded video segments with the encoded audio file to produce an encoded audio-video file. The method might also comprise outputting, with the computing system, the encoded audio-video file.

In some embodiments, the computing system might comprise at least one of a media encoder, a media transcoder, an encoding controller, a transcoding controller, a set-top box ("STB"), a digital video recording ("DVR") device, a media player, a processor of a display device, a processor of a user device, a server computer over a network, a distributed computing system, a serverless computing system, or a cloud-based computing system over a network, and/or the like.

According to some embodiments, the plurality of parallel video encoders might comprise a plurality of parallel video transcoders, while the audio encoder might comprise an audio transcoder. In such cases, concurrently encoding, using the plurality of parallel video encoders, the plurality of video segments, each video encoder of the plurality of parallel video encoders encoding one video segment of the plurality of video segments, might comprise concurrently transcoding, using the plurality of parallel video transcoders, the plurality of video segments, each video transcoder of the plurality of parallel video transcoders transcoding one video segment of the plurality of video segments, each video transcoder corresponding to each video segment. Encoding, using the audio encoder, the audio file might comprise transcoding, using the audio transcoder, the audio file. Assembling, with the computing system, the plurality of encoded video segments with the encoded audio file to produce the encoded audio-video file might comprise assembling, with the computing system, the plurality of transcoded video segments with the transcoded audio file to produce a transcoded audio-video file. Outputting, with the computing system, the encoded audio-video file might comprise outputting, with the computing system, the transcoded audio-video file.

In some embodiments, splitting, with the computing system, the received audio-video file into the single video file and the single audio file might comprise splitting, using an audio-video splitter, the received audio-video file into the single video file and the single audio file. In some instances, splitting, with the computing system, the single video file into the plurality of video segments might comprise splitting, using a video chunking system, the single video file into the plurality of video segments. According to some embodiments, assembling, with the computing system, the plurality of encoded video segments with the encoded audio file to produce the encoded audio-video file might comprise assembling, using an audio-video assembler, the plurality of encoded video segments with the encoded audio file to produce the encoded audio-video file. In some cases, outputting the encoded audio-video file might comprise outputting, with the computing system, the encoded audio-video file to a display device, wherein the display device comprises one of a television set, a smart television, a computer monitor, or a laptop monitor, and/or the like.

Merely by way of example, splitting, with the computing system, the single video file into the plurality of video segments might comprise splitting, with the computing system, the single video file into one of 5, 10, 15, 20, 25, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 3000, 4000, 5000, 6000, 7000, 8000, 9000, or 10000 ms video segments, and/or the like.

Alternatively, or additionally, splitting, with the computing system, the single video file into the plurality of video segments might comprise splitting, with the computing system, the single video file into a number of video segments, the number of video segments ranging from one of between 2 and 10, between 10 and 50, between 50 and 100, between 100 and 500, between 500 and 1000, between 1000 and 5000, between 5000 and 10000, between 10000 and 15000, between 15000 and 20000, between 20000 and 25000, between 25000 and 30000, between 30000 and 35000, between 35000 and 40000, between 40000 and 45000, between 45000 and 50000, between 50000 and 55000, between 55000 and 60000, between 60000 and 65000, between 65000 and 70000, between 70000 and 75000, between 75000 and 80000, between 80000 and 85000, between 85000 and 90000, between 90000 and 95000, between 95000 and 100000, between 100000 and 110000, between 110000 and 115000, between 115000 and 120000, between 120000 and 125000, between 125000 and 130000, between 130000 and 135000, between 135000 and 140000, between 140000 and 145000, between 145000 and 150000, between 150000 and 155000, between 155000 and 160000, between 160000 and 165000, between 165000 and 170000, between 170000 and 175000, between 175000 and 180000, between 180000 and 185000, between 185000 and 190000, between 190000 and 195000, between 195000 and 200000, between 200000 and 1000000, between 1000000 and 5000000, between 5000000 and 10000000, or between 10000000 and 15000000 video segments, and/or the like.

In an aspect, an apparatus might comprise a plurality of parallel video encoders; an audio encoder; at least one processor; and a non-transitory computer readable medium communicatively coupled to the at least one processor. The non-transitory computer readable medium might have stored thereon computer software comprising a set of instructions that, when executed by the at least one processor, causes the apparatus to: receive an audio-video file from a media content source; split the received audio-video file into a single video file and a single audio file; split the single video file into a plurality of video segments; concurrently encode, using the plurality of parallel video encoders, the plurality of video segments, each video encoder of the plurality of parallel video encoders encoding one video segment of the plurality of video segments, each video encoder corresponding to each video segment; encode, using the audio encoder, the single audio file; assemble the plurality of encoded video segments with the encoded audio file to produce an encoded audio-video file; and output the encoded audio-video file.

In some embodiments, the apparatus might comprise at least one of a media encoder, a media transcoder, an encoding controller, a transcoding controller, a set-top box ("STB"), a digital video recording ("DVR") device, a media player, a processor of a display device, a processor of a user device, a server computer over a network, a distributed computing system, a serverless computing system, or a cloud-based computing system over a network, and/or the like.

According to some embodiments, the plurality of parallel video encoders might comprise a plurality of parallel video transcoders, while the audio encoder might comprise an audio transcoder. In such cases, concurrently encoding, using the plurality of parallel video encoders, the plurality of video segments, each video encoder of the plurality of parallel video encoders encoding one video segment of the plurality of video segments, might comprise concurrently transcoding, using the plurality of parallel video transcoders, the plurality of video segments, each video transcoder of the plurality of parallel video transcoders transcoding one video segment of the plurality of video segments, each video transcoder corresponding to each video segment. Encoding, using the audio encoder, the audio file might comprise transcoding, using the audio transcoder, the audio file. Assembling the plurality of encoded video segments with the encoded audio file to produce the encoded audio-video file might comprise assembling the plurality of transcoded video segments with the transcoded audio file to produce a transcoded audio-video file. Outputting the encoded audio-video file might comprise outputting the transcoded audio-video file.

In some embodiments, splitting the received audio-video file into the single video file and the single audio file might comprise splitting, using an audio-video splitter, the received audio-video file into the single video file and the single audio file. In some instances, splitting the single video file into the plurality of video segments might comprise splitting, using a video chunking system, the single video file into the plurality of video segments. According to some embodiments, assembling the plurality of encoded video segments with the encoded audio file to produce the encoded audio-video file might comprise assembling, using an audio-video assembler, the plurality of encoded video segments with the encoded audio file to produce the encoded audio-video file. In some cases, outputting the encoded audio-video file might comprise outputting the encoded audio-video file to a display device, wherein the display device comprises one of a television set, a smart television, a computer monitor, or a laptop monitor, and/or the like.

Merely by way of example, splitting the single video file into the plurality of video segments might comprise splitting the single video file into one of 5, 10, 15, 20, 25, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 3000, 4000, 5000, 6000, 7000, 8000, 9000, or 10000 ms video segments, and/or the like.

Alternatively, or additionally, splitting the single video file into the plurality of video segments might comprise splitting the single video file into a number of video segments, the number of video segments ranging from one of between 2 and 10, between 10 and 50, between 50 and 100, between 100 and 500, between 500 and 1000, between 1000 and 5000, between 5000 and 10000, between 10000 and 15000, between 15000 and 20000, between 20000 and 25000, between 25000 and 30000, between 30000 and 35000, between 35000 and 40000, between 40000 and 45000, between 45000 and 50000, between 50000 and 55000, between 55000 and 60000, between 60000 and 65000, between 65000 and 70000, between 70000 and 75000, between 75000 and 80000, between 80000 and 85000, between 85000 and 90000, between 90000 and 95000, between 95000 and 100000, between 100000 and 110000, between 110000 and 115000, between 115000 and 120000, between 120000 and 125000, between 125000 and 130000, between 130000 and 135000, between 135000 and 140000, between 140000 and 145000, between 145000 and 150000, between 150000 and 155000, between 155000 and 160000, between 160000 and 165000, between 165000 and 170000, between 170000 and 175000, between 175000 and 180000, between 180000 and 185000, between 185000 and 190000, between 190000 and 195000, between 195000 and 200000, between 200000 and 1000000, between 1000000 and 5000000, between 5000000 and 10000000, or between 10000000 and 15000000 video segments, and/or the like.

In yet another aspect, a system might comprise a computing system, an audio-video splitter, a video chunking system, a plurality of parallel video encoders, an audio encoder, and an audio-video assembler. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive an audio-video file from a media content source.

The audio-video splitter might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the audio-video splitter to: split the received audio-video file into a single video file and a single audio file.

The video chunking system might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the video chunking system to: split the single video file into a plurality of video segments.

Each of the plurality of parallel video encoders might comprise at least one fourth processor and a fourth non-transitory computer readable medium communicatively coupled to the at least one fourth processor. The fourth non-transitory computer readable medium might have stored thereon computer software comprising a fourth set of instructions that, when executed by the at least one fourth processor, causes the video encoder to: encode one video segment of the plurality of video segments concurrent with encoding of other video segments of the plurality of video segments by other video encoders of the plurality of parallel video encoders, each video encoder corresponding to each video segment.

The audio encoder might comprise at least one fifth processor and a fifth non-transitory computer readable medium communicatively coupled to the at least one fifth processor. The fifth non-transitory computer readable medium might have stored thereon computer software comprising a fifth set of instructions that, when executed by the at least one fifth processor, causes the audio encoder to: encode the single audio file.

The audio-video assembler might comprise at least one sixth processor and a sixth non-transitory computer readable medium communicatively coupled to the at least one sixth processor. The sixth non-transitory computer readable medium might have stored thereon computer software comprising a sixth set of instructions that, when executed by the at least one sixth processor, causes the audio-video assembler to: assemble the plurality of encoded video segments with the encoded audio file to produce an encoded audio-video file.

The first set of instructions, when executed by the at least one first processor, further causes the computing system to: output the encoded audio-video file.

In some embodiments, the system might comprise at least one of a media encoder, a media transcoder, an encoding controller, a transcoding controller, a set-top box ("STB"), a digital video recording ("DVR") device, a media player, a processor of a display device, a processor of a user device, a server computer over a network, a distributed computing system, a serverless computing system, or a cloud-based computing system over a network, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing encoding or transcoding of audio and video, and, more particularly, to methods, systems, and apparatuses for implementing split and parallelized encoding or transcoding of audio and video, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing split and parallelized encoding or transcoding of audio and video, in accordance with various embodiments.

In the non-limiting embodiment of FIG. 1, system 100 might comprise a computing system 105a and a data store or database 110a that is local to the computing system 105a. In some cases, the database 110a might be external, yet communicatively coupled, to the computing system 105a. In other cases, the database 110a might be integrated within the computing system 105a. System 100 might further comprise one or more media content sources or servers 115 and corresponding databases 120 that might communicatively couple with the computing system 105a via one or more networks 125.

In some embodiments, the computing system 105a might include, without limitation, at least one of an audio-video ("A/V") splitter 130, an audio encoder/transcoder 135, a video chunking system 140, a plurality of video encoders/transcoders 145a-145n (collectively, "video encoders/transcoders 145" or the like), and/or A/V assembler 150, and/or the like.

System 100, according to some embodiments, might further comprise one or more display devices 155 (collectively, "display devices 155" or the like), which might each include a display screen 155a, and one or more user devices 160 (collectively, "user devices 160" or the like), which might each include a touchscreen display or touchscreen display device 160a, and/or the like. In some cases, system 100 might further, or optionally, comprise one or more audio playback devices 165a-165n (collectively, "audio playback devices 165" or "speakers 165" or the like), and/or the like. Each of the one or more display devices 155 and/or the one or more user devices 160 might communicatively couple to the computing system 105a, and/or to each other, either via wireless connection and/or via wired connection. The one or more user devices 160 might each receive user input from a user (in various embodiments, receiving touch input from the user via the touchscreen display 160a), and might each relay the user input to the computing system 105a, according to some embodiments. According to some embodiments, the user input might include, but not limited to, commands for initiating the encoding/transcoding process, commands for changing settings related to options for splitting video (e.g., by time segments or by number of divisions into a preferred number of video segments, etc.), commands for utilizing predetermined numbers of video encoders/transcoders, commands for utilizing the types of video encoders/transcoders (e.g., serverless computing systems having video encoding/transcoding capabilities, distributed computing systems having video encoding/transcoding capabilities, cloud-based computing systems having video encoding/transcoding capabilities, server computing systems having video encoding/transcoding capabilities, local media encoders/transcoders, remote media encoders/transcoders, local encoding/transcoding controllers, remote encoding/transcoding controllers, etc.), and/or the like.

In some cases, the user devices 160 might include, without limitation, at least one of a dedicated remote control device (with touchscreen display) that is associated with the computing system 105a, a universal remote control device (with touchscreen display) that has been paired, synced, or synchronized with the computing system 105a, a tablet computer that has been paired, synced, or synchronized with the computing system 105a, a smart phone that has been paired, synced, or synchronized with the computing system 105a, or other portable device (with touchscreen display) that has been paired, synced, or synchronized with the computing system 105a, and/or the like. In some cases, the computing system 105a, the database 110a, the one or more display devices 155 (including the display screen(s) 155a and/or the audio playback device(s) 165, etc.), and the user device(s) 160 may be local with the computing system 105a.

In some embodiments, the computing system 105a (or the computing system 105b) might comprise one of a processor of a display device, a processor of a user device, a media device, and/or the like. In some cases, the media device might include, but is not limited to, one of a media encoder, a media transcoder, an encoding controller, a transcoding controller, a set-top box ("STB"), a media player, a gaming console, a server computer, a desktop computer, or a laptop computer, and/or the like. The media player might include, without limitation, one of a digital versatile disc or digital video disc ("DVD") player, a Blu-ray disc ("BD") player, a digital video recording ("DVR") device, a streaming video player, a streaming music player, or a streaming game player, and/or the like, while the one or more display devices 155 might include, but are not limited to, at least one of one or more monitors (e.g., computer monitor or laptop monitor, or the like), one or more television sets (e.g., smart television sets or other television sets, or the like), and/or the like. In some instances, the display device(s) 155 might include, but is not limited to, one of a television set, a smart television, a computer monitor, or a laptop monitor, and/or the like. In some cases, the user device(s) 160 might include, without limitation, one of a laptop computer, a tablet computer, a smart phone, a mobile phone, a personal digital assistant, a remote control device, or a portable gaming device, and/or the like.

The lightning bolt symbols are used to denote wireless communications between the computing system 105a and each of at least one of the display devices 155, between the computing system 105a and each of at least one of the user devices 160, between the display device 155 and the user devices 160, between the computing system 105a and each of the one or more audio playback devices 165a-165n, between the display device 155 and each of at least one of the one or more audio playback devices 165a-165n, between the user devices 160 and each of at least one of the one or more audio playback devices 165a-165n, and/or the like. According to some embodiments, alternative or additional to the computing system 105a and corresponding database 110a being local to the display device 155, the user device 160, and/or the audio playback devices 165a-165n, system 100 might comprise remote computing system 105b and corresponding database(s) 110b that communicatively couple with the one or more display devices 155 and/or with the one or more user devices 160 via the one or more networks 125. According to some embodiments, remote computing system 105b might comprise at least one of a server computer over a network, a distributed computing system, a serverless computing system, or a cloud-based computing system over a network, and/or the like.

In operation, the computing system 105a or the computing system 105b (hereafter referred to simply as "the computing system" or the like) might receive an audio-video file from the one or more media content sources 115 (and/or corresponding databases 120). The computing system and/or the A/V splitter 130 might subsequently split the received audio-video file into a single video file and a single audio file. The computing system and/or the audio encoder/transcoder 135 might encode or transcode the single audio file. Concurrently, the computing system and/or the video chunking system 140 might split or chunk the single video file into a plurality of video segments. The computing system and/or the plurality of parallel video encoders/transcoders 145a-145n might concurrently encode or transcode the plurality of video segments, each video encoder/transcoder 145 of the plurality of parallel video encoders/transcoders 145 encoding or transcoding one video segment of the plurality of video segments (e.g., as shown with respect to the non-limiting embodiment of FIG. 3B), each video encoder/transcoder 145 corresponding to each video segment. Alternatively, each video encoder/transcoder 145 might encode or transcode two or more of the video segments, each being sequentially or serially input into and encoded/transcoded (e.g., as shown with respect to the non-limiting embodiment of FIG. 3A). Subsequently, the computing system and/or the A/V assembler 150 might assemble the plurality of encoded or transcoded video segments with the encoded or transcoded audio file to produce an encoded or transcoded audio-video file. The computing system might output the encoded or transcoded audio-video file—in some cases, outputting the encoded or transcoded audio-video file to at least one of the one or more display devices 155, the one or more user devices 160, and/or the one or more audio playback devices 165a-165n.

Merely by way of example, splitting, with the computing system, the single video file into the plurality of video segments might comprise splitting, with the computing system, the single video file into one of 5, 10, 15, 20, 25, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 3000, 4000, 5000, 6000, 7000, 8000, 9000, or 10000 ms video segments, and/or the like. Alternatively, splitting, with the computing system, the single video file into the plurality of video segments might comprise splitting, with the computing system, the single video file into a number of video segments, the number of video segments ranging from one of between 2 and 10, between 10 and 50, between 50 and 100, between 100 and 500, between 500 and 1000, between 1000 and 5000, between 5000 and 10000, between 10000 and 15000, between 15000 and 20000, between 20000 and 25000, between 25000 and 30000, between 30000 and 35000, between 35000 and 40000, between 40000 and 45000, between 45000 and 50000, between 50000 and 55000, between 55000 and 60000, between 60000 and 65000, between 65000 and 70000, between 70000 and 75000, between 75000 and 80000, between 80000 and 85000, between 85000 and 90000, between 90000 and 95000, between 95000 and 100000, between 100000 and 110000, between 110000 and 115000, between 115000 and 120000, between 120000 and 125000, between 125000 and 130000, between 130000 and 135000, between 135000 and 140000, between 140000 and 145000, between 145000 and 150000, between 150000 and 155000, between 155000 and 160000, between 160000 and 165000, between 165000 and 170000, between 170000 and 175000, between 175000 and 180000, between 180000 and 185000, between 185000 and 190000, between 190000 and 195000, between 195000 and 200000, between 200000 and 1000000, between 1000000 and 5000000, between 5000000 and 10000000, or between 10000000 and 15000000 video segments, and/or the like.

Figure 2:
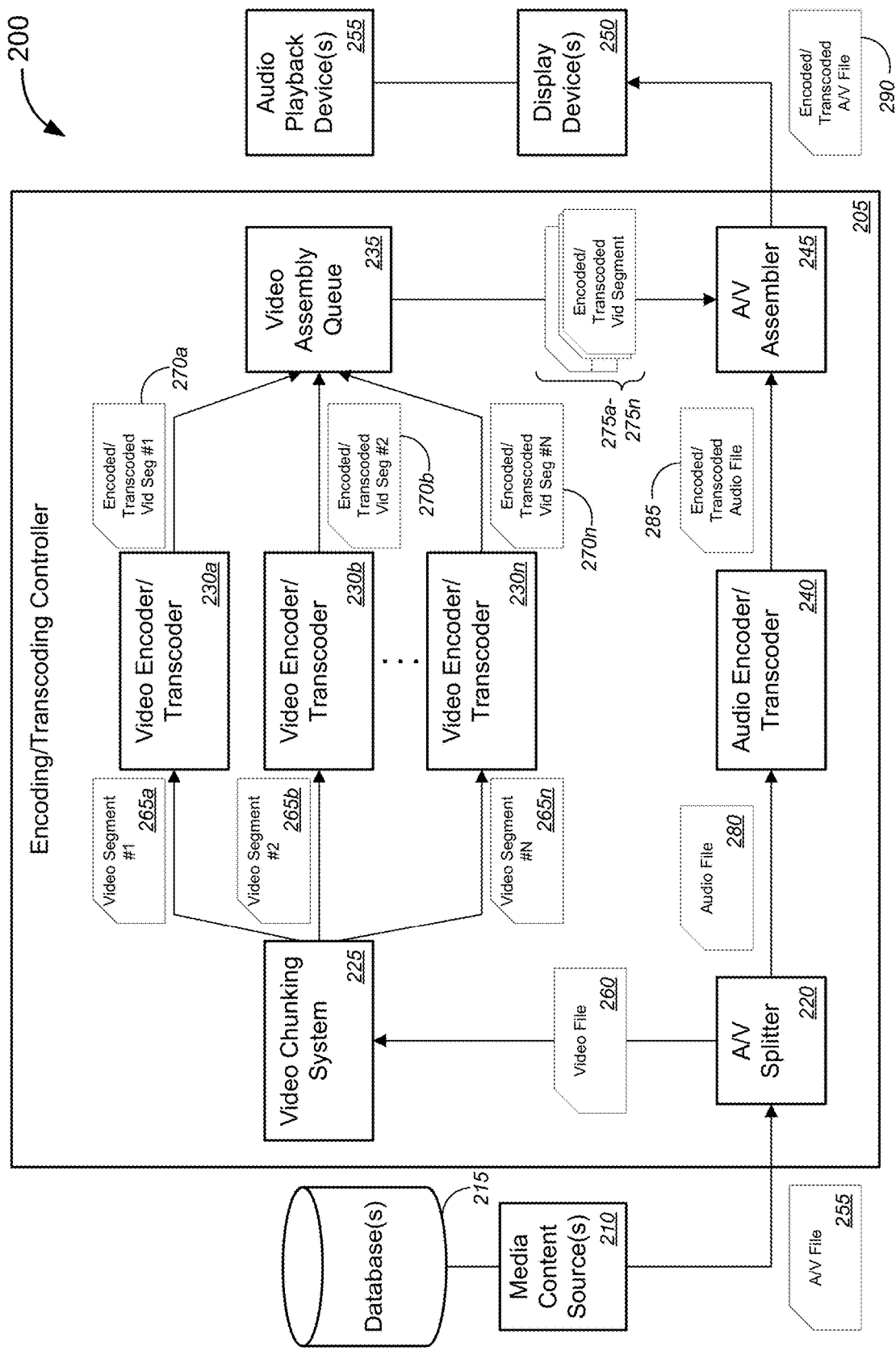
FIG. 2 is a schematic diagram illustrating another system for implementing split and parallelized encoding or transcoding of audio and video, in accordance with various embodiments.

FIG. 2 is a schematic diagram illustrating another system 200 for implementing split and parallelized encoding or transcoding of audio and video, in accordance with various embodiments.

In the non-limiting embodiment of FIG. 2, system 200 might comprise an encoding/transcoding controller 205 (which might correspond to computing system 105a or 105b of FIG. 1, or the like) and a media content source(s) 210 and corresponding database(s) 215. In some embodiments, the encoding/transcoding controller 205 might include, without limitation, an audio-video ("A/V") splitter 220, video chunking system 225, a plurality of video encoders/transcoders 230a-230n (collectively, "video encoders/transcoders 230" or the like), a video assembly queue 235, an audio encoder/transcoder 240, and/or an A/V assembler 245, or the like. System 200 might further comprise a display device(s) 250 and/or an audio playback device(s) 255, or the like.

In operation, the encoding/transcoding controller 205 might receive an audio-video file 255 from the one or more media content sources 210 (and/or corresponding databases 215). The encoding/transcoding controller 205 and/or the A/V splitter 220 might subsequently split the received audio-video file 255 into a single video file 260 and a single audio file 280. Subsequently, the encoding/transcoding controller 205 and/or the video chunking system 225 might split or chunk the single video file 260 into a plurality of video segments 265a-265n (collectively, "video segments 265" or the like). The encoding/transcoding controller 205 and/or the plurality of parallel video encoders/transcoders 230a-230n might concurrently encode or transcode the plurality of video segments 270a-270n (collectively, "encoded or transcoded video segments 270" or the like), each video encoder/transcoder 230 of the plurality of parallel video encoders/transcoders 230 encoding or transcoding one video segment 265 of the plurality of video segments 265a-265n (not unlike the non-limiting embodiment as shown with respect to FIG. 3B), each video encoder/transcoder 230 corresponding to each video segment 265. Alternatively, although not shown in FIG. 2, each video encoder/transcoder 230 might encode or transcode two or more of the video segments 265 (the number of video encoders/transcoders 230 being fewer than that of the video segments 265), each being sequentially or serially input into and encoded/transcoded (e.g., as shown with respect to the non-limiting embodiment of FIG. 3A). The encoding/transcoding controller 205 and/or the video assembly queue 235 might set the plurality of video segments 265a-265n into a queue or set of ordered encoded/transcoded video segments 275a-275n (collectively, "ordered encoded/transcoded video segments 275" or the like). Concurrent with the split and parallel encoding or transcoding of the video file or video segments, the encoding/transcoding controller 205 and/or the audio encoder/transcoder 240 might encode or transcode the single audio file 285.

Subsequently, the encoding/transcoding controller 205 and/or the A/V assembler 245 might assemble the plurality of encoded or transcoded video segments with the encoded or transcoded audio file to produce an encoded or transcoded audio-video file 290. The encoding/transcoding controller 205 might output the encoded or transcoded audio-video file 290—in some cases, outputting the encoded or transcoded audio-video file 290 to at least one of the one or more display devices 250 and/or the one or more audio playback devices 255a-255n, or the like.

Merely by way of example, splitting, with the encoding/transcoding controller 205, the single video file into the plurality of video segments might comprise splitting, with the encoding/transcoding controller 205, the single video file into one of 5, 10, 15, 20, 25, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 3000, 4000, 5000, 6000, 7000, 8000, 9000, or 10000 ms video segments, and/or the like. Alternatively, splitting, with the encoding/transcoding controller 205, the single video file into the plurality of video segments might comprise splitting, with the encoding/transcoding controller 205, the single video file into a number of video segments, the number of video segments ranging from one of between 2 and 10, between 10 and 50, between 50 and 100, between 100 and 500, between 500 and 1000, between 1000 and 5000, between 5000 and 10000, between 10000 and 15000, between 15000 and 20000, between 20000 and 25000, between 25000 and 30000, between 30000 and 35000, between 35000 and 40000, between 40000 and 45000, between 45000 and 50000, between 50000 and 55000, between 55000 and 60000, between 60000 and 65000, between 65000 and 70000, between 70000 and 75000, between 75000 and 80000, between 80000 and 85000, between 85000 and 90000, between 90000 and 95000, between 95000 and 100000, between 100000 and 110000, between 110000 and 115000, between 115000 and 120000, between 120000 and 125000, between 125000 and 130000, between 130000 and 135000, between 135000 and 140000, between 140000 and 145000, between 145000 and 150000, between 150000 and 155000, between 155000 and 160000, between 160000 and 165000, between 165000 and 170000, between 170000 and 175000, between 175000 and 180000, between 180000 and 185000, between 185000 and 190000, between 190000 and 195000, between 195000 and 200000, between 200000 and 1000000, between 1000000 and 5000000, between 5000000 and 10000000, or between 10000000 and 15000000 video segments, and/or the like.

In some embodiments, the encoding/transcoding controller 205, the media content source(s) 210, the database(s) 215, the A/V splitter 220, the video chunking system 225, the plurality of video encoders/transcoders 230, the audio encoder/transcoder 240, the A/V assembler 245, the display device(s) 250, and the audio playback device(s) 255 of FIG. 2 might correspond to computing system 105a or 105b, the media content source(s) 115, the database(s) 120, the A/V splitter 130, the video chunking system 140, the plurality of video encoders/transcoders 145, the audio encoder/transcoder 135, the A/V assembler 150, the display device(s) 155, and the audio playback device(s) 165 of FIG. 1, and the descriptions of these components of the embodiment of FIG. 1 apply to the corresponding components of the embodiment of FIG. 2.

Figure 3B:
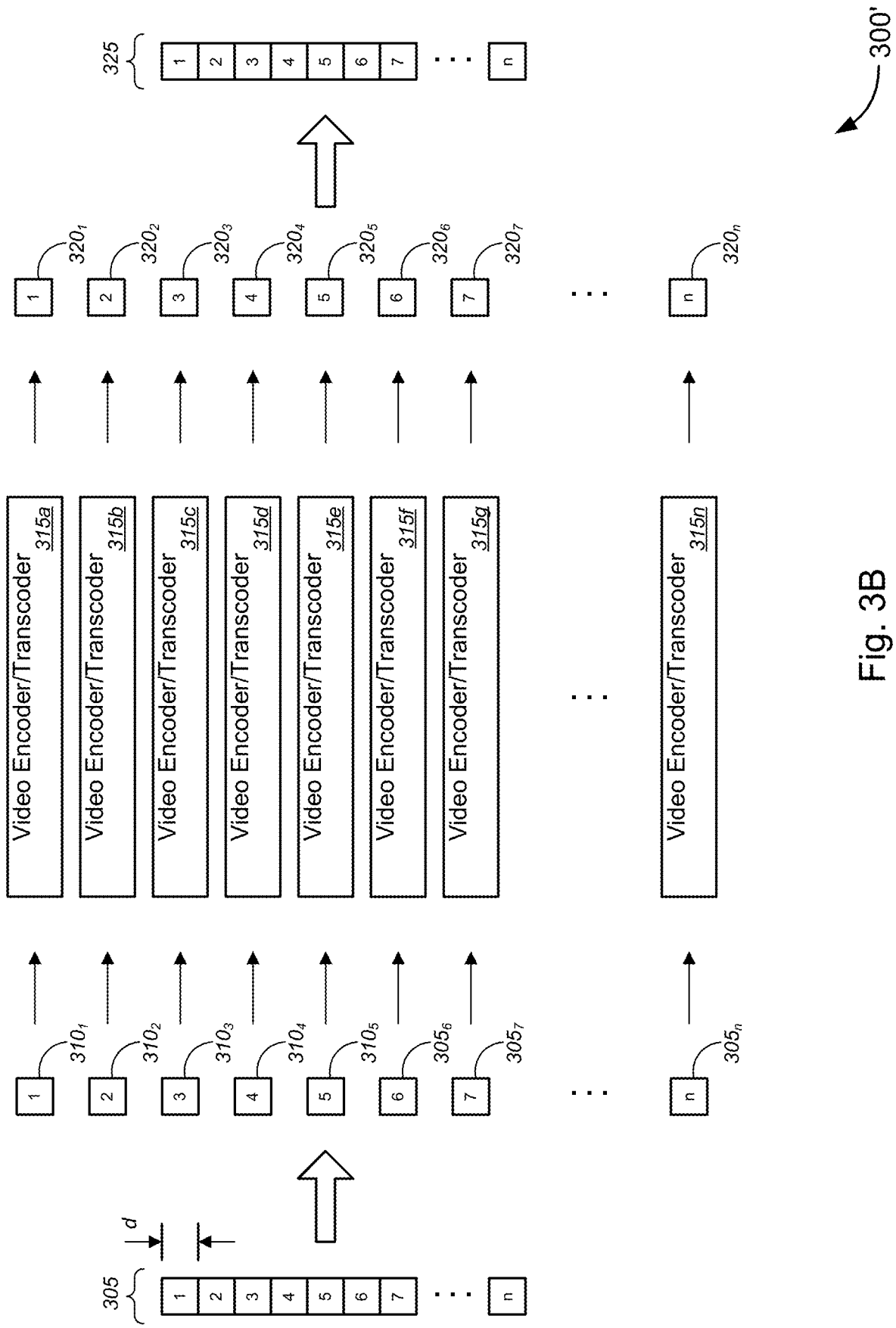

FIGS. 3A and 3B (collectively, "FIG. 3") are schematic diagrams illustrating various embodiments 300 and 300' for implementing split and parallelized encoding or transcoding of video files that have been split from an audio-video file. FIG. 3A depicts a non-limiting embodiment 300 in which a single video file or stream is split into a plurality of video segments and in which a set of video encoders/transcoders each encode or transcode two or more of the plurality of video segments, while FIG. 3B depicts a non-limiting embodiment 300' in which a single video file or stream is split into a plurality of video segments and in which a set of video encoders/transcoders each encode or transcode a single video segment of the plurality of video segments (where the number of video encoders/transcoders equals the number of video segments in the plurality of video segments).

With reference to FIG. 3A, after a single audio-video file or stream has been split into a single video file or stream and a single audio file or stream, the single video file or stream 305 might be split or chunked (e.g., by a video chunking system, or the like) into a plurality of video segments $310_1$ through $310_n$ (collectively, "video segments 310" or the like). A plurality of video encoders/transcoders 315a-315e (collectively, "video encoders/transcoders 315" or the like), which might number fewer than the number of video segments of the plurality of video segments 310, might each encode or transcode two or more of the plurality of video segments. For example, in the non-limiting embodiment 300 of FIG. 3A, five video encoders/transcoders 315a-315e are shown encoding or transcoding video segments $310_1$, $310_6$, and $310_{11}$, video segments $310_2$, $310_7$, and $310_{12}$, video segments $310_3$ and $310_8$, video segments $310_4$ and $310_9$, video segments $310_5$, $310_{10}$, and $310_n$, respectively, outputting encoded or transcoded video segments $320_1$ through $320_n$ (collectively, "encoded video segments 320," "transcoded video segments 320," or "encoded or transcoded video segments," or the like). A computing system or an audio-video assembler (not shown in FIG. 3) might assemble the plurality of encoded or transcoded video segments 320 into a single encoded or transcoded video file or stream 325, which would concurrently or subsequently be assembled with an encoded or transcoded audio file or stream (not shown in FIG. 3).

Alternatively, referring to FIG. 3B, after a single audio-video file or stream has been split into a single video file or stream and a single audio file or stream, the single video file or stream 305 might be split or chunked (e.g., by a video chunking system, or the like) into a plurality of video segments $310_1$ through $310_n$ (collectively, "video segments 310" or the like). A plurality of video encoders/transcoders 315a-315n (collectively, "video encoders/transcoders 315" or the like), whose number might equal the number of video segments of the plurality of video segments 310, might each encode or transcode one video segment of the plurality of video segments. For example, in the non-limiting embodiment 300' of FIG. 3B, N number of video encoders/transcoders 315a-315n are shown encoding or transcoding N number of video segments 310a-310n (collectively, "encoded video segments 320," "transcoded video segments 320," or "encoded or transcoded video segments," or the like), on a one-to-one basis. In operation, once the number of video segments has been chosen, selected, assigned, or determined, based on one or more factors (including, but not limited to, user preference, default settings, particularized customization dependent on the particular video content or video file being split and encoded/transcoded, and/or the like), the system engages, tasks, or otherwise assigns the same number of video encoders/transcoders 315 to handle the task of one-on-one encoding/transcoding of the video segments. For serverless computing systems, for example, such assignment or tasking of video encoders/transcoders (i.e., compute resources having encoding/transcoding functionalities) is optimized because such serverless computing systems are typically robust, extremely scalable, scalable on demand, and may be rented or otherwise billed on a per-use basis or on a per-duration basis (e.g., 1 s increments, 100 ms increments, 10 ms increments, or the like), etc., thus resulting in extremely efficient, low-cost, high-throughput encoding/transcoding of video content when implemented in accordance with the various embodiments as described herein. A computing system or an audio-video assembler (not shown in FIG. 3) might assemble the plurality of encoded or transcoded video segments 320 into a single encoded or transcoded video file or stream 325, which would concurrently or subsequently be assembled with an encoded or transcoded audio file or stream (not shown in FIG. 3).

In each of the embodiments 300 and 300' of FIGS. 3A and 3B, each video segment 310 or 320 might have a width or duration of 5, 10, 15, 20, 25, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 3000, 4000, 5000, 6000, 7000, 8000, 9000, or 10000 ms video segments, or the like. Alternatively, or additionally, the single video file or stream 305 might be split into a number of video segments, the number of video segments ranging from one of between 2 and 10, between 10 and 50, between 50 and 100, between 100 and 500, between 500 and 1000, between 1000 and 5000, between 5000 and 10000, between 10000 and 15000, between 15000 and 20000, between 20000 and 25000, between 25000 and 30000, between 30000 and 35000, between 35000 and 40000, between 40000 and 45000, between 45000 and 50000, between 50000 and 55000, between 55000 and 60000, between 60000 and 65000, between 65000 and 70000, between 70000 and 75000, between 75000 and 80000, between 80000 and 85000, between 85000 and 90000, between 90000 and 95000, between 95000 and 100000, between 100000 and 110000, between 110000 and 115000, between 115000 and 120000, between 120000 and 125000, between 125000 and 130000, between 130000 and 135000, between 135000 and 140000, between 140000 and 145000, between 145000 and 150000, between 150000 and 155000, between 155000 and 160000, between 160000 and 165000, between 165000 and 170000, between 170000 and 175000, between 175000 and 180000, between 180000 and 185000, between 185000 and 190000, between 190000 and 195000, between 195000 and 200000, between 200000 and 1000000, between 1000000 and 5000000, between 5000000 and 10000000, or between 10000000 and 15000000 video segments, and/or the like.

Figure 4:
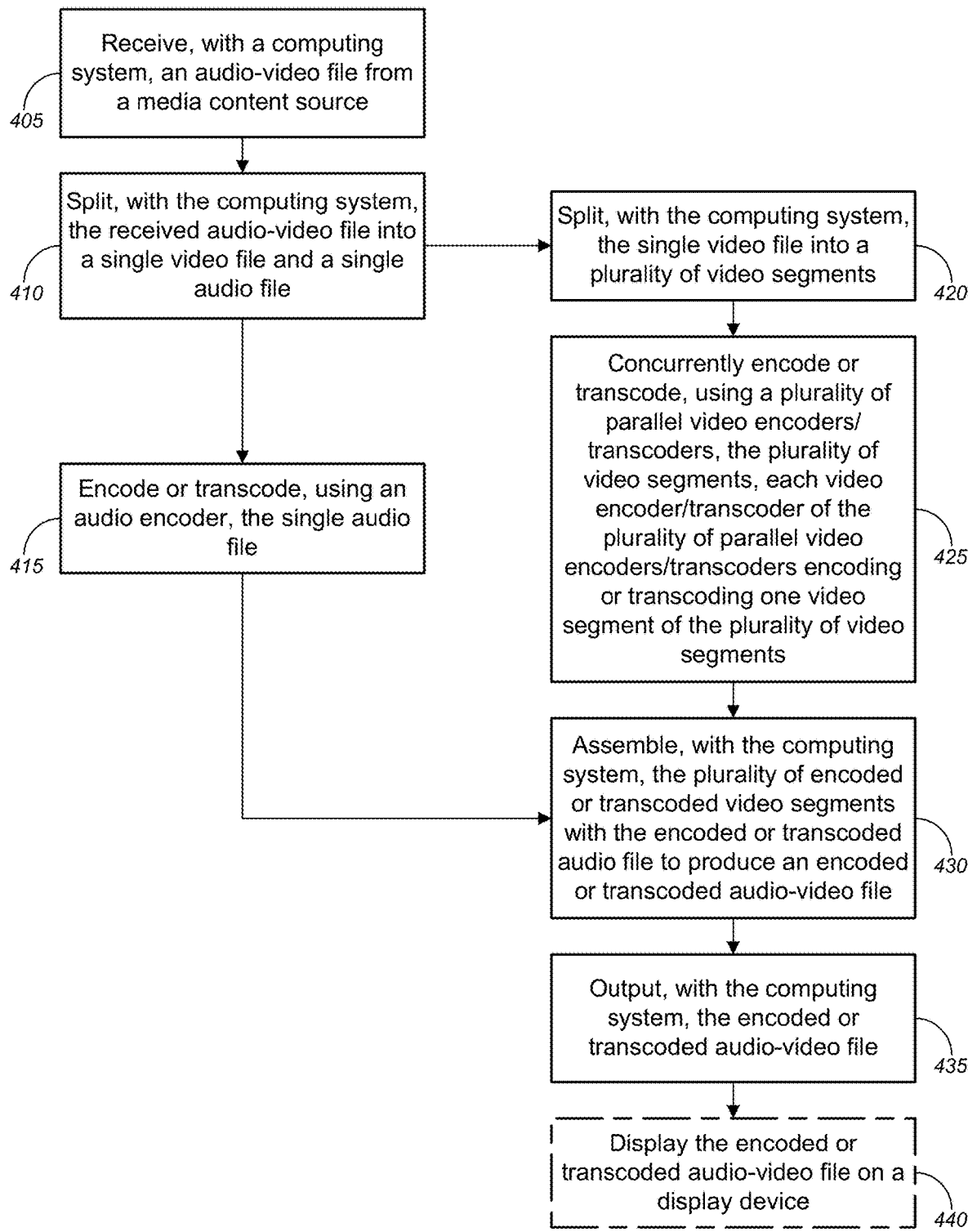
FIG. 4 is a flow diagrams illustrating a method for implementing split and parallelized encoding or transcoding of audio and video, in accordance with various embodiments.

FIG. 4 is a flow diagrams illustrating a method 400 for implementing split and parallelized encoding or transcoding of audio and video, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems or embodiments 100, 200, 300, and 300' of FIGS. 1, 2, 3A, and 3B, respectively (or components thereof), such methods may also be implemented using any suitable hardware (or software) implementation. Similarly, while each of the systems or embodiments 100, 200, 300, and 300' of FIGS. 1, 2, 3A, and 3B, respectively (or components thereof), can operate according to the method 400 illustrated by FIG. 4 (e.g., by executing instructions embodied on a computer readable medium), the systems or embodiments 100, 200, 300, and 300' of FIGS. 1, 2, 3A, and 3B can each also operate according to other modes of operation and/or perform other suitable procedures.

In the non-limiting embodiment of FIG. 4, method 400, at block 405, might comprise receiving, with a computing system, an audio-video file from a media content source. In some cases, the computing system might include, without limitation, at least one of a media encoder, a media transcoder, an encoding controller, a transcoding controller, a set-top box ("STB"), a digital video recording ("DVR") device, a media player, a processor of a display device, a processor of a user device, a server computer over a network, a distributed computing system, a serverless computing system, or a cloud-based computing system over a network, and/or the like.

At block 410, method 400 might comprise splitting, with the computing system, the received audio-video file into a single video file and a single audio file. In some embodiments, splitting, with the computing system, the received audio-video file into the single video file and the single audio file (at block 410) might comprise splitting, using an audio-video ("A/V") splitter, the received audio-video file into the single video file and the single audio file. Method 400 might further comprise, at block 415, encoding or transcoding, using an audio encoder/transcoder, the single audio file.

Concurrent with encoding or transcoding the single audio file (at block 415), method 400 might further comprise splitting, with the computing system, the single video file into a plurality of video segments (block 420). According to some embodiments, splitting, with the computing system, the single video file into the plurality of video segments (at block 420) might comprise splitting, using a video chunking system, the single video file into the plurality of video segments.

Merely by way of example, splitting, with the computing system, the single video file into the plurality of video segments might comprise splitting, with the computing system, the single video file into one of 5, 10, 15, 20, 25, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 3000, 4000, 5000, 6000, 7000, 8000, 9000, or 10000 ms video segments, and/or the like. Alternatively, splitting, with the computing system, the single video file into the plurality of video segments might comprise splitting, with the computing system, the single video file into a number of video segments, the number of video segments ranging from one of between 2 and 10, between 10 and 50, between 50 and 100, between 100 and 500, between 500 and 1000, between 1000 and 5000, between 5000 and 10000, between 10000 and 15000, between 15000 and 20000, between 20000 and 25000, between 25000 and 30000, between 30000 and 35000, between 35000 and 40000, between 40000 and 45000, between 45000 and 50000, between 50000 and 55000, between 55000 and 60000, between 60000 and 65000, between 65000 and 70000, between 70000 and 75000, between 75000 and 80000, between 80000 and 85000, between 85000 and 90000, between 90000 and 95000, between 95000 and 100000, between 100000 and 110000, between 110000 and 115000, between 115000 and 120000, between 120000 and 125000, between 125000 and 130000, between 130000 and 135000, between 135000 and 140000, between 140000 and 145000, between 145000 and 150000, between 150000 and 155000, between 155000 and 160000, between 160000 and 165000, between 165000 and 170000, between 170000 and 175000, between 175000 and 180000, between 180000 and 185000, between 185000 and 190000, between 190000 and 195000, between 195000 and 200000, between 200000 and 1000000, between 1000000 and 5000000, between 5000000 and 10000000, or between 10000000 and 15000000 video segments, and/or the like.

At block 425, method 400 might comprise concurrently encoding or transcoding, using a plurality of parallel video encoders/transcoders, the plurality of video segments, each video encoder/transcoder of the plurality of parallel video encoders/transcoders encoding or transcoding one video segment of the plurality of video segments (e.g., as shown with respect to the non-limiting embodiment of FIG. 3B), each video encoder/transcoder corresponding to each video segment. Alternatively, although not shown in FIG. 4, each video encoder/transcoder might encode or transcode two or more of the video segments, each being sequentially or serially input into and encoded/transcoded (e.g., as shown with respect to the non-limiting embodiment of FIG. 3A).

Method 400, at block 430, might comprise assembling, with the computing system, the plurality of encoded or transcoded video segments with the encoded or transcoded audio file to produce an encoded or transcoded audio-video file. In some embodiments, assembling, with the computing system, the plurality of encoded video segments with the encoded audio file to produce the encoded audio-video file (at block 430) might comprise assembling, using an audio-video assembler, the plurality of encoded or transcoded video segments with the encoded or transcoded audio file to produce the encoded or transcoded audio-video file.

Method 400 might further comprise outputting, with the computing system, the encoded or transcoded audio-video file (block 435). According to some embodiments, outputting the encoded or transcoded audio-video file (at block 435) might comprise outputting, with the computing system, the encoded or transcoded audio-video file to a display device. In some cases, the display device might include, but is not limited to, one of a television set, a smart television, a computer monitor, or a laptop monitor, and/or the like. At optional block 440, method 400 might comprise displaying the encoded or transcoded audio-video file on the display device.

Exemplary System and Hardware Implementation

Figure 5:
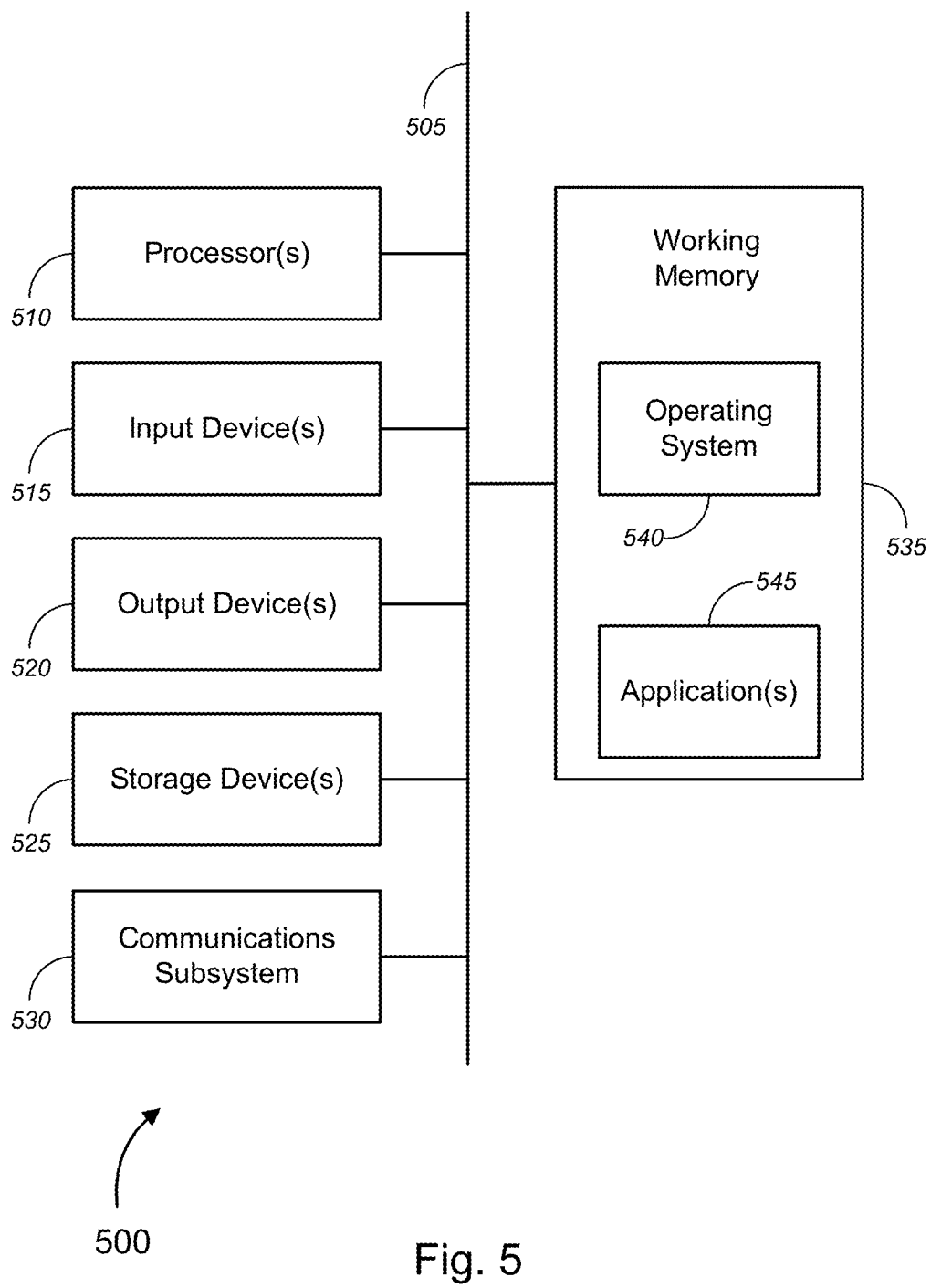
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a and 105b, encoding/transcoding controller 205, media content sources 115 and 210, A/V splitters 130 and 220, audio encoders/transcoders 135 and 240, video chunking systems 140 and 225, video encoders/transcoders 145a-145n, 230a-230n, and 315a-315n, video assembly queue 235, A/V assemblers 150 and 245, display devices 155 and 250, user devices 160, audio playback devices 165a-165n and 255, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a and 105b, encoding/transcoding controller 205, media content sources 115 and 210, A/V splitters 130 and 220, audio encoders/transcoders 135 and 240, video chunking systems 140 and 225, video encoders/transcoders 145a-145n, 230a-230n, and 315a-

315*n*, video assembly queue 235, A/V assemblers 150 and 245, display devices 155 and 250, user devices 160, audio playback devices 165*a*-165*n* and 255, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
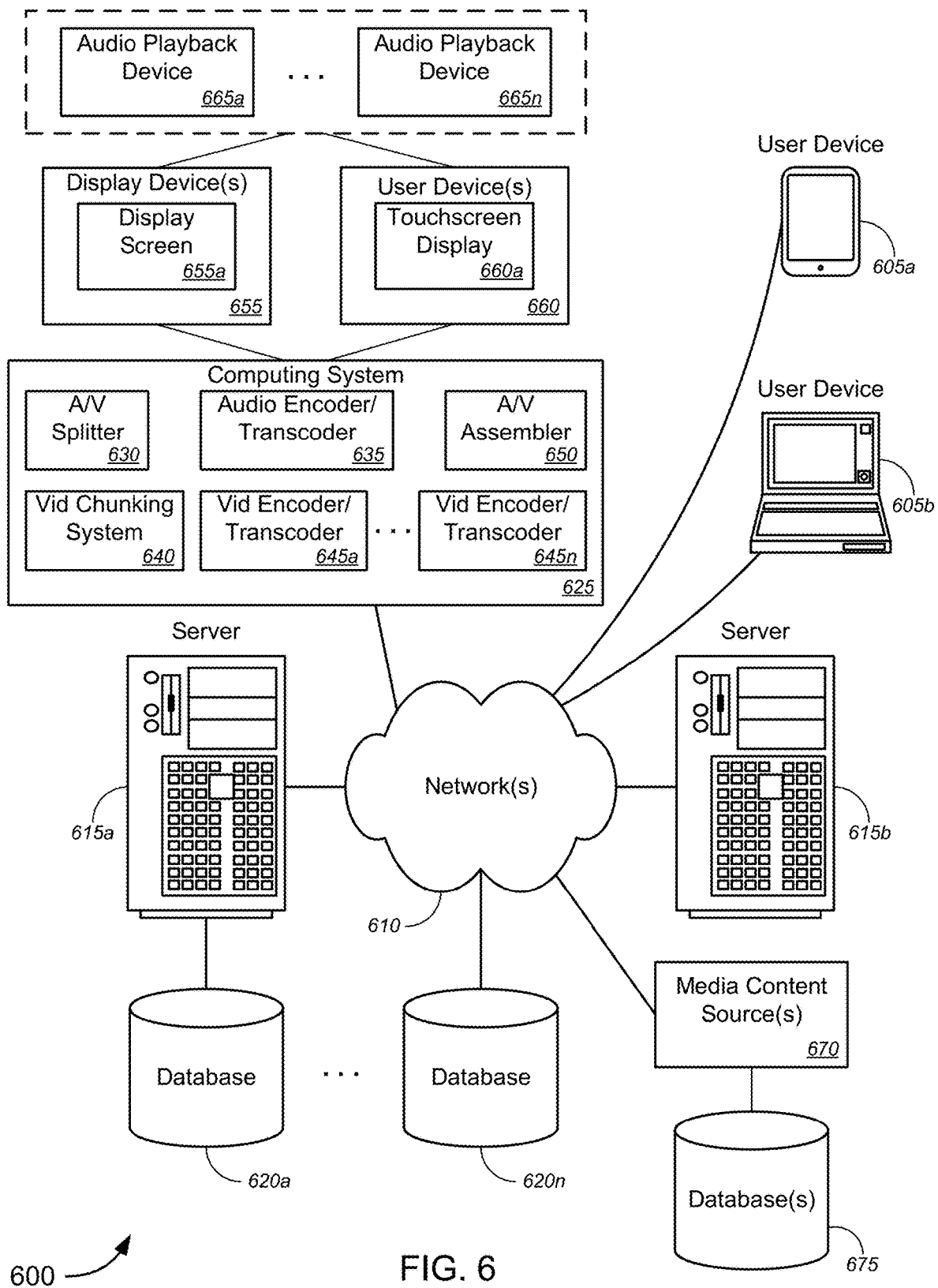
FIG. 6 is a block diagram illustrating a networked system of computers, computing systems, or system hardware architecture, which can be used in accordance with various embodiments.

As noted above, a set of embodiments comprises methods and systems for implementing encoding or transcoding of audio and video, and, more particularly, to methods, systems, and apparatuses for implementing split and parallelized encoding or transcoding of audio and video. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 125 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing encoding or transcoding of audio and video, and, more particularly, to methods, systems, and apparatuses for implementing split and parallelized encoding or transcoding of audio and video, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105a and 105b, or encoding/transcoding controller 205 of FIGS. 1 and 2, or the like), which might include, without limitation, A/V splitter 630 (similar to A/V splitters 130 and 220 of FIGS. 1 and 2, or the like), audio encoder/transcoder 635 (similar to audio encoders/transcoders 135 and 240 of FIGS. 1 and 2, or the like), video chunking system 640 (similar to video chunking systems 140 and 225 of FIGS. 1 and 2, or the like), video encoders/transcoders 645a-645n (similar to video encoders/transcoders 145a-145n, 230a-230n, and 315a-315n of FIGS. 1, 2, and 3, or the like), and/or A/V assembler 650 (similar to A/V assemblers 150 and 245 of FIGS. 1 and 2, or the like), or the like. System 600 might further comprise one or more display devices 655 each with display screen 655a (similar to display devices 155 and 250 of FIGS. 1 and 2, or the like), one or more user devices 660 each with touchscreen display 660a (similar to user devices 160 of FIG. 1, or the like), one or more audio playback devices 665a-665n (similar to audio playback devices 165a-165n and 255 of FIGS. 1 and 2, or the like), one or more media (e.g., video) content sources 670 and corresponding database(s) 675 (similar to media or video content sources (or servers) 115 and 210 and corresponding databases 120 and 215 of FIGS. 1 and 2, or the like), and/or the like. In some embodiments, the computing system 625 might comprise a media device that is communicatively coupled to a playback device(s) (i.e., one or more of display device(s) 655, the user device(s) 605 or 660, and/or audio playback device(s) 665a-665n, or the like). In some cases, the media device might comprise at least one of a media encoder, a media transcoder, an encoding controller, a transcoding controller, a set-top box ("STB"), a digital video recording ("DVR") device, a media player, a server computer, a desktop computer, or a laptop computer, and/or the like. The media player might comprise one of a digital versatile disc or digital video disc ("DVD") player, a Blu-ray disc ("BD") player, a streaming video player, or a streaming music player, and/or the like, while the playback device might comprise at least one of one or more monitors, one or more television sets, or one or more speakers, and/or the like.

In operation, the computing system 625 might receive an audio-video file from the one or more media content sources 670 (and/or corresponding databases 675). The computing system 625 and/or the A/V splitter 630 might subsequently split the received audio-video file into a single video file and a single audio file. The computing system 625 and/or the audio encoder/transcoder 635 might encode or transcode the single audio file. Concurrently, the computing system 625 and/or the video chunking system 640 might split or chunk the single video file into a plurality of video segments. The computing system 625 and/or the plurality of parallel video encoders/transcoders 645a-645n might concurrently encode or transcode the plurality of video segments, each video encoder/transcoder 645 of the plurality of parallel video encoders/transcoders 645 encoding or transcoding one video segment of the plurality of video segments, each video encoder/transcoder 645 corresponding to each video segment. Subsequently, the computing system 625 and/or the A/V assembler 650 might assemble the plurality of encoded or transcoded video segments with the encoded or transcoded audio file to produce an encoded or transcoded audio-video file. The computing system 625 might output the encoded or transcoded audio-video file—in some cases, outputting the encoded or transcoded audio-video file to at least one of the one or more display devices 655, the one or more user devices 660, and/or the one or more audio playback devices 665a-665n.

These and other functions of the system 600 (and its components) are described in greater detail above with respect to FIGS. 1-4.

The accompanying method claims, in some cases, can be considered computer-implemented methods.

Although the accompanying claims are presented with single dependencies, this is to satisfy the requirements of certain jurisdictions. Unless it is clear that the features are presented as incompatible alternatives, the features of any dependent claim can be combined with those of any one or more dependent claims before it, together with the features of the independent claim upon which these dependent claims ultimately depend. In other words, the dependent claims can be combined as if they contain multiple dependencies, as are allowed in some jurisdictions, and multiple dependencies may be inserted in the dependent claims.

One aspect provides a computer readable medium comprising computer executable instructions that, when executed by a computer, cause the computer to perform the method of any of the accompanying method claims or a relevant part of the method.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system, an audio-video file from a media content source;
   splitting, with the computing system, the received audio-video file into a single video file and a single audio file;
   splitting, with the computing system, the single video file into a plurality of video segments;
   concurrently encoding, using a plurality of parallel video encoders, the plurality of video segments, each video encoder of the plurality of parallel video encoders encoding one video segment of the plurality of video segments, each video encoder corresponding to each video segment;
   encoding, using an audio encoder, the single audio file;
   assembling, with the computing system, the plurality of encoded video segments with the encoded audio file to produce an encoded audio-video file; and
   outputting, with the computing system, the encoded audio-video file.

2. The method of claim 1, wherein the computing system comprises at least one of a media encoder, a media transcoder, an encoding controller, a transcoding controller, a set-top box ("STB"), a digital video recording ("DVR") device, a media player, a processor of a display device, a processor of a user device, a server computer over a network, a distributed computing system, a serverless computing system, or a cloud-based computing system over a network.

3. The method of claim 1, wherein the plurality of parallel video encoders comprises a plurality of parallel video transcoders, wherein the audio encoder comprises an audio transcoder, wherein:
   concurrently encoding, using the plurality of parallel video encoders, the plurality of video segments, each video encoder of the plurality of parallel video encoders encoding one video segment of the plurality of video segments, comprises concurrently transcoding, using the plurality of parallel video transcoders, the plurality of video segments, each video transcoder of the plurality of parallel video transcoders transcoding one video segment of the plurality of video segments, each video transcoder corresponding to each video segment;
   encoding, using the audio encoder, the audio file comprises transcoding, using the audio transcoder, the audio file;
   assembling, with the computing system, the plurality of encoded video segments with the encoded audio file to produce the encoded audio-video file comprises assembling, with the computing system, the plurality of transcoded video segments with the transcoded audio file to produce a transcoded audio-video file; and
   outputting, with the computing system, the encoded audio-video file comprises outputting, with the computing system, the transcoded audio-video file.

4. The method of claim 1, wherein splitting, with the computing system, the received audio-video file into the single video file and the single audio file comprises splitting, using an audio-video splitter, the received audio-video file into the single video file and the single audio file.

5. The method of claim 1, wherein splitting, with the computing system, the single video file into the plurality of video segments comprises splitting, using a video chunking system, the single video file into the plurality of video segments.

6. The method of claim 1, wherein assembling, with the computing system, the plurality of encoded video segments with the encoded audio file to produce the encoded audio-video file comprises assembling, using an audio-video assembler, the plurality of encoded video segments with the encoded audio file to produce the encoded audio-video file.

7. The method of claim 1, wherein outputting the encoded audio-video file comprises outputting, with the computing system, the encoded audio-video file to a display device, wherein the display device comprises one of a television set, a smart television, a computer monitor, or a laptop monitor.

8. The method of claim 1, wherein splitting, with the computing system, the single video file into the plurality of video segments comprises splitting, with the computing system, the single video file into one of 5, 10, 15, 20, 25, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 3000, 4000, 5000, 6000, 7000, 8000, 9000, or 10000 ms video segments.

9. The method of claim 1, wherein splitting, with the computing system, the single video file into the plurality of video segments comprises splitting, with the computing system, the single video file into a number of video segments, the number of video segments ranging from one of between 2 and 10, between 10 and 50, between 50 and 100, between 100 and 500, between 500 and 1000, between 1000 and 5000, between 5000 and 10000, between 10000 and 15000, between 15000 and 20000, between 20000 and 25000, between 25000 and 30000, between 30000 and 35000, between 35000 and 40000, between 40000 and 45000, between 45000 and 50000, between 50000 and 55000, between 55000 and 60000, between 60000 and 65000, between 65000 and 70000, between 70000 and 75000, between 75000 and 80000, between 80000 and 85000, between 85000 and 90000, between 90000 and 95000, between 95000 and 100000, between 100000 and 110000, between 110000 and 115000, between 115000 and 120000, between 120000 and 125000, between 125000 and 130000, between 130000 and 135000, between 135000 and 140000, between 140000 and 145000, between 145000 and 150000, between 150000 and 155000, between 155000 and 160000, between 160000 and 165000, between 165000 and 170000, between 170000 and 175000, between 175000 and 180000, between 180000 and 185000, between 185000 and 190000, between 190000 and 195000, between 195000 and 200000, between 200000 and 1000000, between 1000000 and 5000000, between 5000000 and 10000000, or between 10000000 and 15000000 video segments.

10. An apparatus, comprising:
a plurality of parallel video encoders;
an audio encoder;
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive an audio-video file from a media content source;
split the received audio-video file into a single video file and a single audio file;
split the single video file into a plurality of video segments;
concurrently encode, using the plurality of parallel video encoders, the plurality of video segments, each video encoder of the plurality of parallel video encoders encoding one video segment of the plurality of video segments, each video encoder corresponding to each video segment;
encode, using the audio encoder, the single audio file;
assemble the plurality of encoded video segments with the encoded audio file to produce an encoded audio-video file; and
output the encoded audio-video file.

11. The apparatus of claim 10, wherein the apparatus comprises at least one of a media encoder, a media transcoder, an encoding controller, a transcoding controller, a set-top box ("STB"), a digital video recording ("DVR") device, a media player, a processor of a display device, a processor of a user device, a server computer over a network, a distributed computing system, a serverless computing system, or a cloud-based computing system over a network.

12. The apparatus of claim 10, wherein the plurality of parallel video encoders comprises a plurality of parallel video transcoders, wherein the audio encoder comprises an audio transcoder, wherein:

concurrently encoding, using the plurality of parallel video encoders, the plurality of video segments, each video encoder of the plurality of parallel video encoders encoding one video segment of the plurality of video segments, comprises concurrently transcoding, using the plurality of parallel video transcoders, the plurality of video segments, each video transcoder of the plurality of parallel video transcoders transcoding one video segment of the plurality of video segments, each video transcoder corresponding to each video segment;
encoding, using the audio encoder, the audio file comprises transcoding, using the audio transcoder, the audio file;
assembling the plurality of encoded video segments with the encoded audio file to produce the encoded audio-video file comprises assembling the plurality of transcoded video segments with the transcoded audio file to produce a transcoded audio-video file; and
outputting the encoded audio-video file comprises outputting the transcoded audio-video file.

13. The apparatus of claim 10, wherein splitting the received audio-video file into the single video file and the single audio file comprises splitting, using an audio-video splitter, the received audio-video file into the single video file and the single audio file.

14. The apparatus of claim 10, wherein splitting the single video file into the plurality of video segments comprises splitting, using a video chunking system, the single video file into the plurality of video segments.

15. The apparatus of claim 10, wherein assembling the plurality of encoded video segments with the encoded audio file to produce the encoded audio-video file comprises assembling, using an audio-video assembler, the plurality of encoded video segments with the encoded audio file to produce the encoded audio-video file.

16. The apparatus of claim 10, wherein outputting the encoded audio-video file comprises outputting the encoded audio-video file to a display device, wherein the display device comprises one of a television set, a smart television, a computer monitor, or a laptop monitor.

17. The apparatus of claim 10, wherein splitting the single video file into the plurality of video segments comprises splitting the single video file into one of 5, 10, 15, 20, 25, 30, 40, 50, 60, 70, 80, 90, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1600, 1700, 1800, 1900, 2000, 3000, 4000, 5000, 6000, 7000, 8000, 9000, or 10000 ms video segments.

18. The apparatus of claim 10, wherein splitting the single video file into the plurality of video segments comprises splitting the single video file into a number of video segments, the number of video segments ranging from one of between 2 and 10, between 10 and 50, between 50 and 100, between 100 and 500, between 500 and 1000, between 1000 and 5000, between 5000 and 10000, between 10000 and 15000, between 15000 and 20000, between 20000 and 25000, between 25000 and 30000, between 30000 and 35000, between 35000 and 40000, between 40000 and 45000, between 45000 and 50000, between 50000 and 55000, between 55000 and 60000, between 60000 and 65000, between 65000 and 70000, between 70000 and 75000, between 75000 and 80000, between 80000 and 85000, between 85000 and 90000, between 90000 and 95000, between 95000 and 100000, between 100000 and 110000, between 110000 and 115000, between 115000 and 120000, between 120000 and 125000, between 125000 and 130000, between 130000 and 135000, between 135000 and 140000, between 140000 and 145000, between 145000 and 150000, between 150000 and 155000, between 155000 and 160000, between 160000 and 165000, between 165000 and 170000, between 170000 and 175000, between 175000 and 180000, between 180000 and 185000, between 185000 and 190000, between 190000 and 195000, between 195000 and 200000, between 200000 and 1000000, between 1000000 and 5000000, between 5000000 and 10000000, or between 10000000 and 15000000 video segments.

19. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive an audio-video file from a media content source;
an audio-video splitter, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the audio-video splitter to:
split the received audio-video file into a single video file and a single audio file;
a video chunking system, comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes the video chunking system to:
split the single video file into a plurality of video segments;
a plurality of parallel video encoders, each comprising:
at least one fourth processor; and
a fourth non-transitory computer readable medium communicatively coupled to the at least one fourth processor, the fourth non-transitory computer readable medium having stored thereon computer software comprising a fourth set of instructions that, when executed by the at least one fourth processor, causes the video encoder to:
encode one video segment of the plurality of video segments concurrent with encoding of other video segments of the plurality of video segments by other video encoders of the plurality of parallel video encoders, each video encoder corresponding to each video segment;
an audio encoder, comprising:
at least one fifth processor; and
a fifth non-transitory computer readable medium communicatively coupled to the at least one fifth processor, the fifth non-transitory computer readable medium having stored thereon computer software comprising a fifth set of instructions that, when executed by the at least one fifth processor, causes the audio encoder to:
encode the single audio file; and
an audio-video assembler, comprising:
at least one sixth processor; and
a sixth non-transitory computer readable medium communicatively coupled to the at least one sixth processor, the sixth non-transitory computer readable medium having stored thereon computer software comprising a sixth set of instructions that, when executed by the at least one sixth processor, causes the audio-video assembler to:
assemble the plurality of encoded video segments with the encoded audio file to produce an encoded audio-video file;
wherein the first set of instructions, when executed by the at least one first processor, further causes the computing system to:
output the encoded audio-video file.

20. The system of claim 19, wherein the system comprises at least one of a media encoder, a media transcoder, an encoding controller, a transcoding controller, a set-top box ("STB"), a digital video recording ("DVR") device, a media player, a processor of a display device, a processor of a user device, a server computer over a network, a distributed computing system, a serverless computing system, or a cloud-based computing system over a network.

* * * * *